US009224151B2

(12) United States Patent
Sinyagin et al.

(10) Patent No.: US 9,224,151 B2
(45) Date of Patent: Dec. 29, 2015

(54) PRESENTING ADVERTISEMENTS BASED ON WEB-PAGE INTERACTION

(75) Inventors: Aleksey Y. Sinyagin, Bothell, WA (US);
Michael S. Luther, Issaquah, WA (US)

(73) Assignee: MICROSOFT TECHNOLOGY LICENSING, L.L.C., Redmond, WA (US)

(*) Notice: Subject to any disclaimer, the term of this patent is extended or adjusted under 35 U.S.C. 154(b) by 878 days.

(21) Appl. No.: 12/141,720

(22) Filed: Jun. 18, 2008

(65) Prior Publication Data

US 2009/0319355 A1 Dec. 24, 2009

(51) Int. Cl.
*G06Q 30/00* (2012.01)
*G06Q 30/02* (2012.01)

(52) U.S. Cl.
CPC ............ *G06Q 30/02* (2013.01); *G06Q 30/0224* (2013.01)

(58) Field of Classification Search
USPC ................................................ 705/14, 35, 26
See application file for complete search history.

(56) References Cited

U.S. PATENT DOCUMENTS

| 6,477,575 | B1 | 11/2002 | Koeppel |
| 6,973,505 | B1 * | 12/2005 | Schneider ..................... 709/245 |
| 7,346,606 | B2 | 3/2008 | Bharat |
| 2003/0078928 | A1 | 4/2003 | Dorosario |
| 0200/4133848 | | 7/2004 | Hunt et al. |

(Continued)

FOREIGN PATENT DOCUMENTS

| AU | 2009260643 | 4/2009 |
| BR | PI0913363-1 | 4/2009 |

(Continued)

OTHER PUBLICATIONS

International Searching Authority; PCT/US2009/041264, filed Apr. 21, 2009; Date of Mailing, Dec. 18, 2009; 11 pages.

(Continued)

*Primary Examiner* — Ojo Oyebisi
(74) *Attorney, Agent, or Firm* — Joann Dewey; Jim Ross; Micky Minhas

(57) ABSTRACT

Embodiments of the invention provide a method, system, and media for presenting advertisements (or other information) based on user interaction with a web page. One embodiment of the method includes determining that programmatic code that describes the web page is to be dynamically modified before it is to be presented on a display device. The method further includes identifying remotely stored supplemental information that is associated with the web page. The supplemental information includes a listing of words on the web page that are to be considered key words which key words are to be associated with descriptive terms that relate to the key words. The descriptive terms might even be generated after a rendering of the web page as well as before. Additional supplemental information might include a listing of triggering events that are associated with different objects of the web page (such as key words, text boxes, etc.) such that if an object is interacted with in a predetermined way, then some action is to follow. The method additionally includes modifying the programmatic code of the web page according to the supplemental information, observing a triggering event, gathering descriptive words associated with the occurrence of the event trigger, communicating the appropriate descriptive words so as to return fresh advertising content, and without obscuring an initial content of the web page, presenting information based on the advertising content.

30 Claims, 10 Drawing Sheets

(56) References Cited

U.S. PATENT DOCUMENTS

| | | |
|---|---|---|
| 2004/0260767 A1 | 12/2004 | Kedem |
| 2005/0144073 A1 | 6/2005 | Morrisroe |
| 2005/0216823 A1* | 9/2005 | Petersen et al. ............ 715/501.1 |
| 0200/7073690 | 3/2007 | Boal et al. |
| 2007/0078707 A1 | 4/2007 | Axe |
| 0200/7146812 | 6/2007 | Lawton |
| 2007/0156520 A1 | 7/2007 | Sharma |
| 2008/0010270 A1 | 1/2008 | Gross |

FOREIGN PATENT DOCUMENTS

| | | |
|---|---|---|
| CA | 2723912 | 4/2009 |
| CN | 200980123543.X | 4/2009 |
| EP | 09767180.4 | 4/2009 |
| IN | 8041/CHENP/2010 | 4/2009 |
| JP | 2002-091997 A | 3/2002 |
| JP | 2007-272872 A | 10/2007 |
| JP | 2011-514643 | 4/2009 |
| KR | 1020030091085 | 12/2003 |
| KR | 1020030091085 A | 12/2003 |
| KR | 1020030096113 | 12/2003 |
| KR | 1020030096113 A | 12/2003 |
| KR | 100495034 B1 | 6/2005 |
| KR | 10-2010-7028318 | 4/2009 |
| MX | MX/a/2010/013579 | 4/2009 |
| MY | PI2010005165 | 4/2009 |
| SG | 201304595-0 | 4/2009 |
| WO | 2009/041264 | 4/2009 |

OTHER PUBLICATIONS

Google's Targeted Keyword Ad Program Shows Strong Momentum with Advertise http://www.google.com/press/pressrel/pressrelease31.html.

The Action Engine Advertising Solution http://www.actionengine.com/docs/datasheets/advertising.pdf.

Adviva http://www.adviva.com/adviva-red.php.

Claria to Launch Behavioral Targeting Network http://publications.mediapost.com/index.cfm?fuseaction=Articles.showArticleHomePage&art_aid=27236.

Office Action in Russian Application 2010151913 mailed May 3, 2011.

CN First Office Action Application No. 200980123543.X, mailed: Nov. 11, 2011.

CN Final Office Action Application No. 200980123543.X, mailed: Aug. 1, 2012.

Office Action in Russian Application 2010151913, mailed: Mar. 3, 2011.

European Search Report Application 09767180.4, dated: Feb. 1, 2013.

"Notice of Allowance Received in Japanese Patent Application No. 2011-514643", Mailed Date: Jan. 17, 2014, Filed Date: Apr. 21, 2009, 3 Pages. (MS# 323815.09) (w/o English Translation).

"First Examination Report Received in Australian Patent Application No. 2009260643", Mailed Date: Feb. 20, 2014, Filed Date: Apr. 21, 2009, 3 Pages. (MS# 323815.03).

"Second Examination Report Received in Australian Patent Application No. 2009260643", Mailed Date: Apr. 16, 2014, Filed Date: Apr. 21, 2009, 4 Pages. (MS# 323815.03).

European Office Action, mailed Nov. 13, 2013, in EP Application No. 09767180.4.

"Office Action issued in Malaysian Patent Application No. PI 2010005165", Mailed Date: Dec. 31, 2014, 5 Pages.

"Office Action Received in Korea Republic of (KR) Patent Application No. 10-2010-7028318", Mailed Date: Aug. 21, 2015, 16 Pages.

* cited by examiner

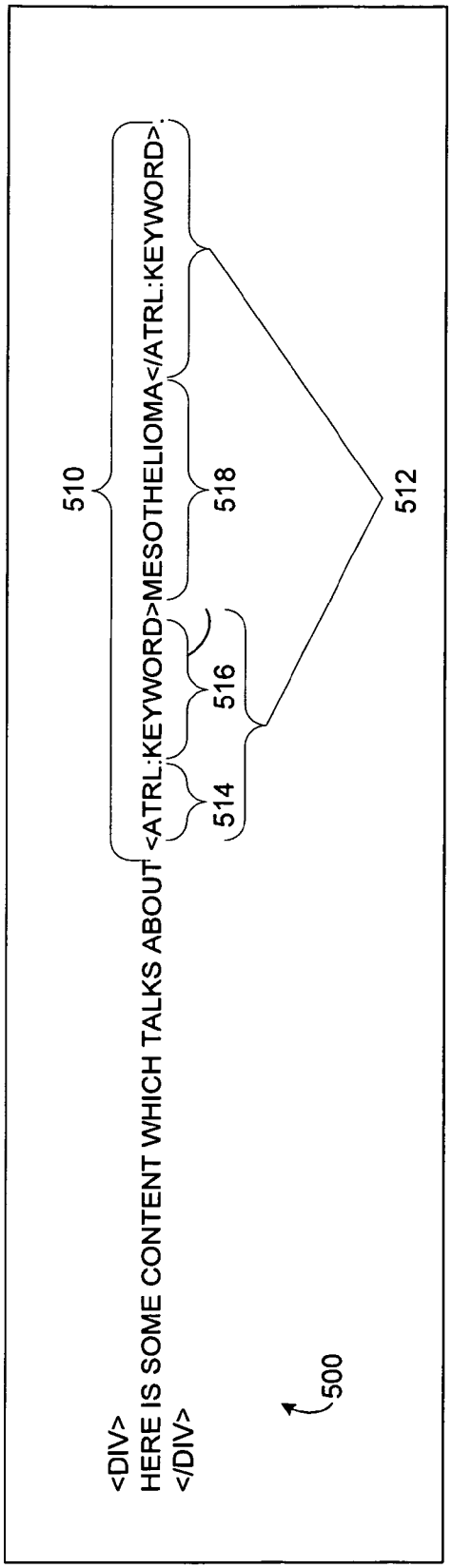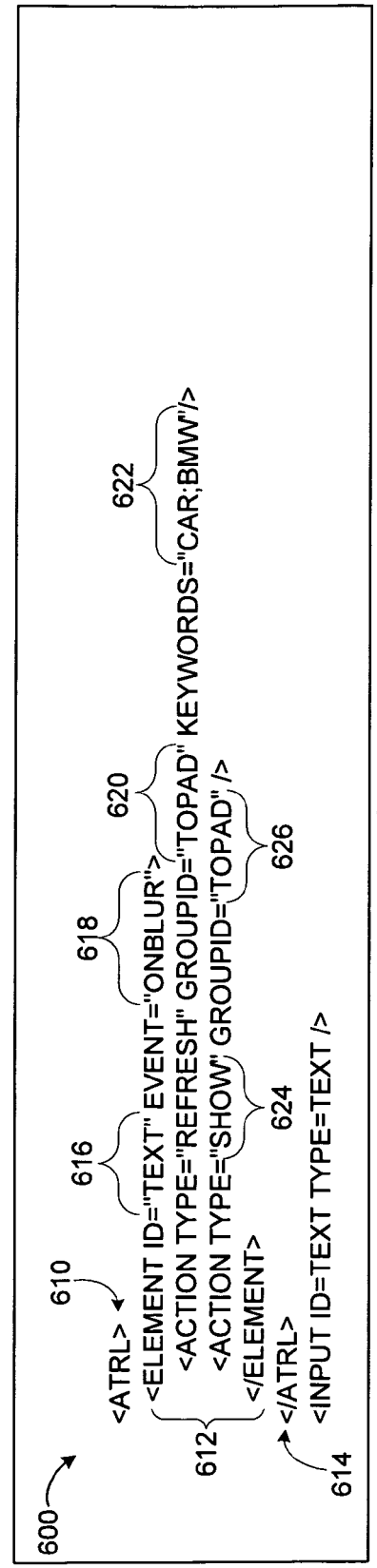

```
<ATRL>
    <ELEMENT ID="TEXT" EVENT="ONBLUR">
        <ACTION TYPE="REFRESH" GROUPID="TOPAD" KEYWORDS="DOCUMENT.GETELEMENTBYID('TEXT').VALUE"
        <ACTION TYPE="SHOW" GROUPID="TOPAD" />
    </ELEMENT>
</ATRL>
<INPUT ID=TEXT TYPE=TEXT />
```

*FIG. 7.*

```
STRINGBUILDER SB = NEW STRINGBUILDER();
SB.APPEND("<ATRL>");
SB.APPEND("<ELEMENT ID='TEXT' EVENT='ONBLUR'>");
SB.APPEND("<ACTION TYPE='REFRESH'");
SB.APPEND("GROUPID='TOPAD' KEYWORDS='CAR;BMW;'/>");
SB.APPEND("<ACTION TYPE='SHOW' GROUPID='TOPAD' />");
SB.APPEND("</ELEMENT>");
SB.APPEND("</ATRL>");
RESPONSE.WRITE(SB.TOSTRING());
```

*FIG. 8.*

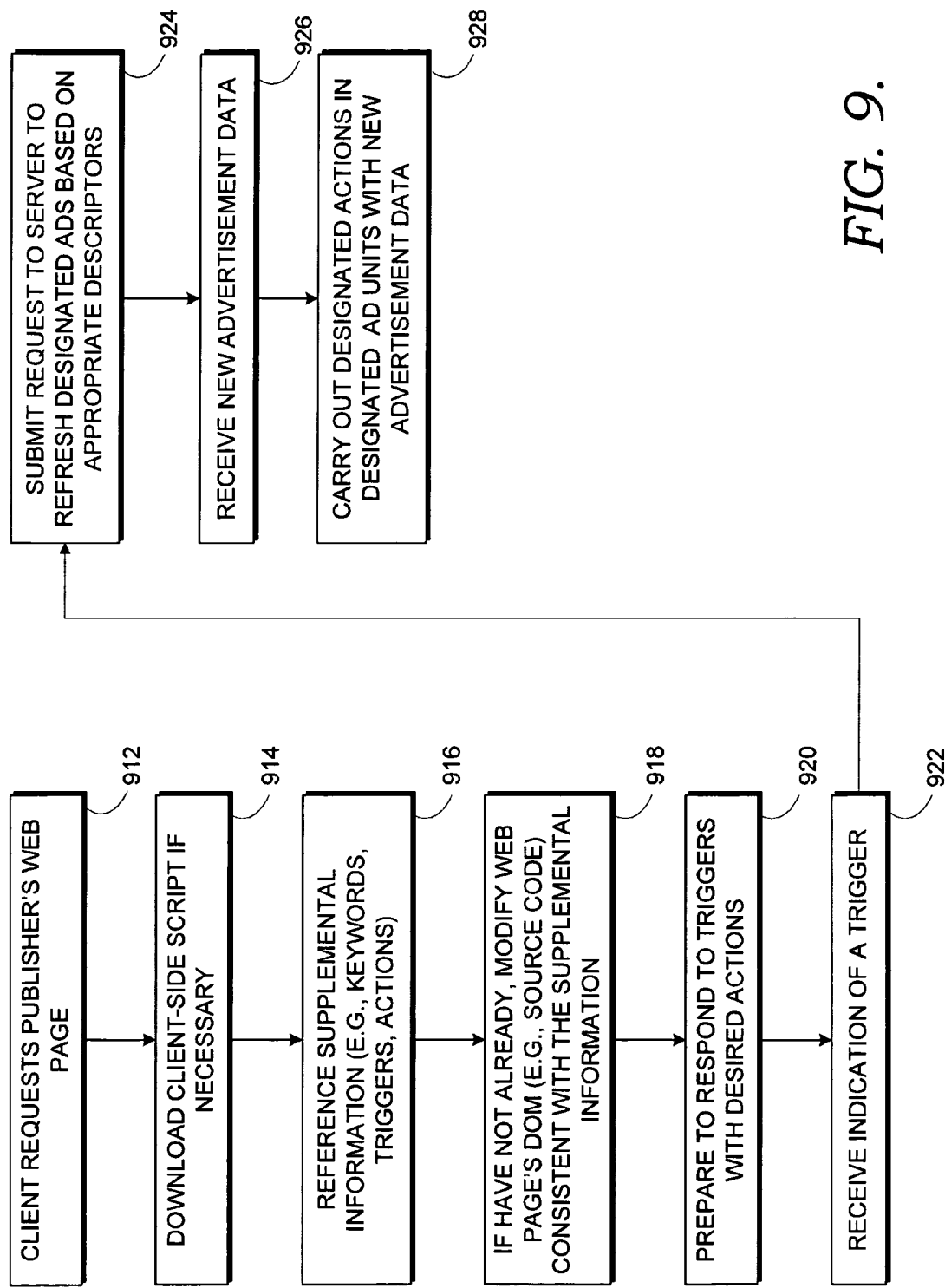

PRESENTING ADVERTISEMENTS BASED ON WEB-PAGE INTERACTION

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. At a high level, our disclosure describes methods and systems for presenting advertisements based on user interaction with a web page.

Briefly, an aspect of our invention describes an ad-triggering framework in which advertisements, or other contextually relevant information, can be dynamically triggered, resulting in a refreshing of information without obscuring current content on a web page. In some embodiments, an initial source code of a web page is dynamically modified to include tags that denote key words, trigger events, and/or actions such that as a user interacts with various items of a web page, certain advertising units are updated based on descriptive terms that are associated with the items interacted with.

BRIEF DESCRIPTION OF THE SEVERAL VIEWS OF THE DRAWINGS

Embodiments of the invention are described in detail below with reference to the drawing figures, which form a part of this disclosure, and are incorporated by reference herein, and wherein:

FIGS. 5-8 depict illustrative syntaxes of a variation of a markup language suitable for use in an embodiment of the present invention;

FIG. 9 depicts a first method for carrying an embodiment of the present invention;

DETAILED DESCRIPTION

Figure 1:
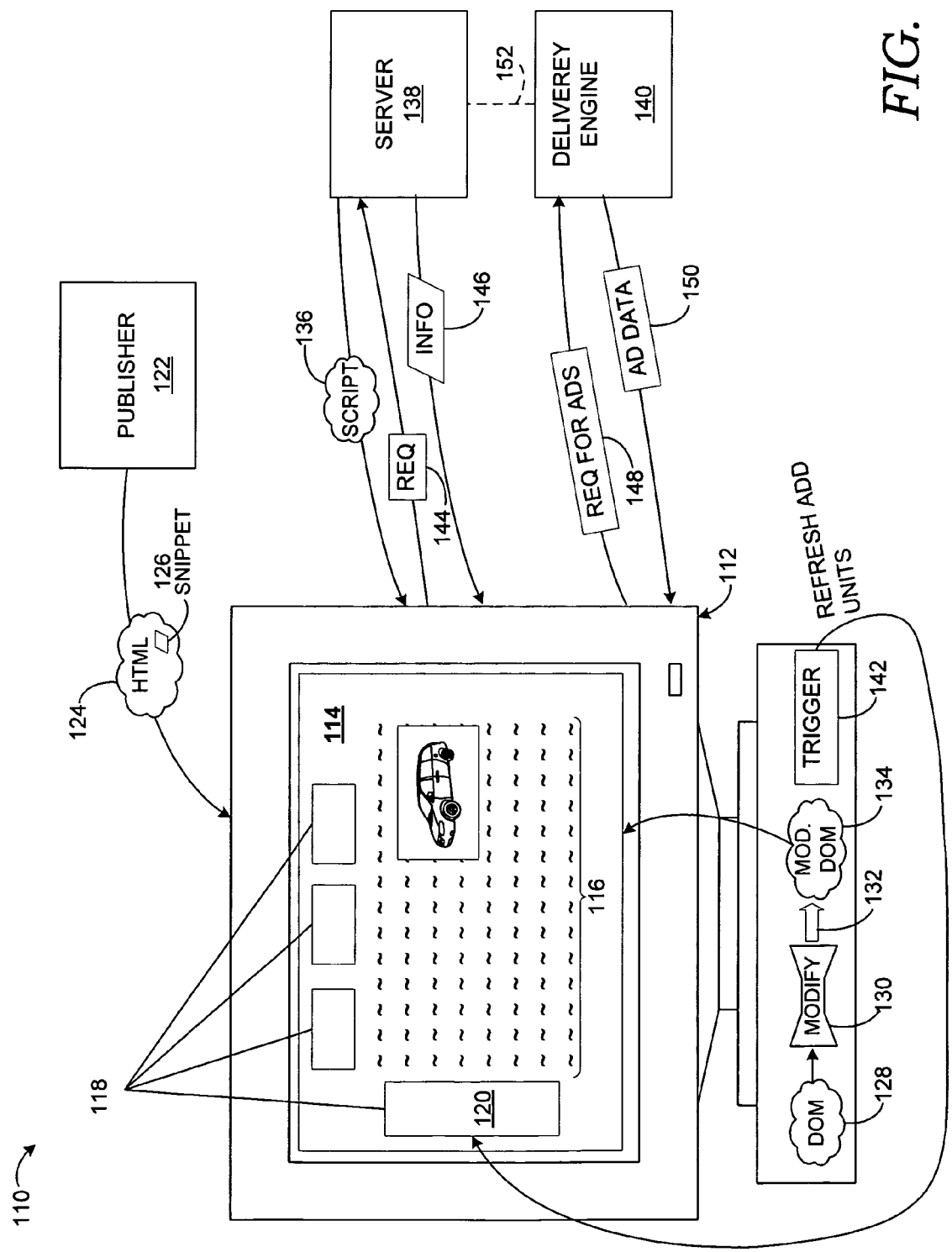
FIG. 1 depicts an illustrative operating environment suitable for practicing an embodiment of the invention.
Figure 2:
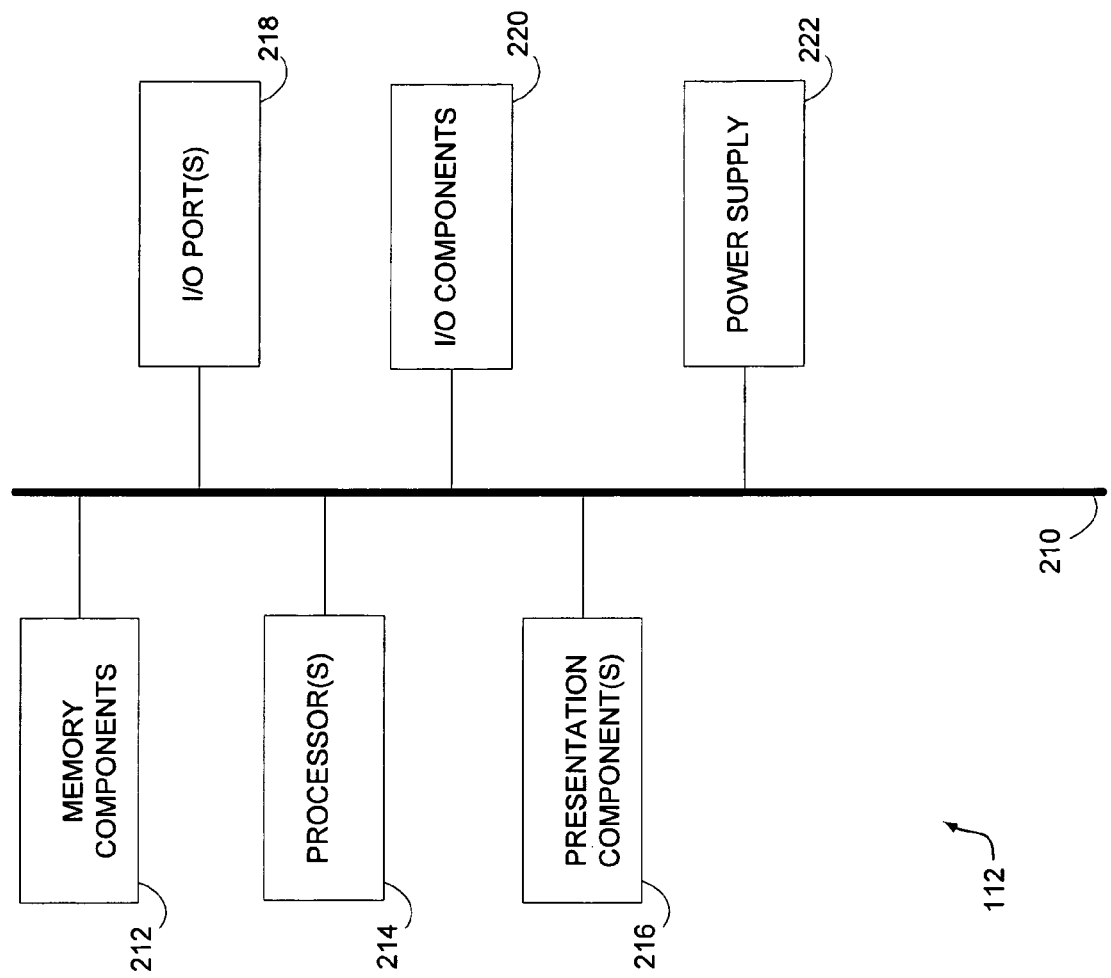
FIG. 2 depicts a block diagram illustrating certain components of an illustrative computing device suitable for practicing an embodiment of the present invention.

With reference to FIG. 1, an illustrative operative environment suitable for practicing an embodiment of the invention is provided and referenced generally by the numeral 110. Operating environment 110 includes a computing device 112, which is schematically described in greater detail in connection with FIG. 2, which we will briefly describe to provide a general overview of computing device 112. In FIG. 2, a diagrammatic block diagram of client computing device 112 is provided. Computing device 112 may take on a variety of forms, including, for example, a computing device such as a gaming console, a client computer, a server computer, variations thereof such as laptop computers and palm-top computers, and in some embodiments devices such as PDAs and smart phones. As shown in FIG. 2, a bus 210 couples one or more memory components 212 to one or more processors 214, various presentation components 216, input/output ports 218, input/output components 220, and at least one power supply 222. Other devices including lower level aspects of the shown devices are not shown so as to not obscure the invention.

Memory components 212 include things such as a hard drive, volatile memory (such as RAM), buffers, and the like. The one or more processors 214 control overall data communications throughout computing device 112. Illustrative presentation components 216 include a video card as well as a monitor or other presentation device. Input/output ports 218 provide connectivity to peripheral components such as printers, digital cameras, and the like. Actual input/output components may be things like printers and the like. A power supply 222 provides power to run computing device 112. Not all of the components shown in FIG. 2 need to be present in order to make up a computing device but are shown for illustrative purposes in connection with describing an embodiment of the invention.

Although the various blocks of FIG. 2 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. We recognize that such is the nature of the art and reiterate that the diagram of FIG. 2 is merely illustrative of an exemplary computing device that can be used in connection with one or more embodiments of the present invention.

Computing device 112 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; carrier wave; or any other medium that can be used to encode desired information and be accessed by computing device 112.

Returning to FIG. 1, computing device 112 is illustratively shown to be presenting a web page 114. Web page 114 is shown in this embodiment to include some illustrative content 116 as well as a set of ad units 118. Any number of advertising units 118 might be included in web page 114, but we show four for illustrative purposes. We show, by way of example, three advertising units along a top of the web page as well as an ad unit along the side of web page 114, which we designate by numeral 120 because later we will refer to a particular ad unit by way of illustration. Ad units 118 are reservoirs to present advertising content on web page 114. Although we use the term "advertising content," we mean to include within the scope of that term more than just advertisements. By way of example, some other illustrative items might include definitions, hyperlinks, or any other type of information that might be relevant to various items of content 116 or portions thereof. We will use the term "advertising content" or just "ads" to help reduce wordiness. Thus, ad units 118 can be any placeholder to receive ads. In some situations, the placeholders are already visible on web page 114, and in other situations they become visible based on some event.

A publisher is referenced by numeral 122. A publisher can be any web-content provider that provides web pages requested by way of client device 112. Thus, we might variously refer to publisher 122 as a content provider, web-page provider, or the like. In some embodiments, the publisher is the content owner. The publisher can be any entity ranging from an individual with a small website or a personal blog to an international company or organization with a comparatively more sophisticated website. Publisher 122 provides HTML 124 to client device 112, which will process HTML 124 to ultimately render web page 114. In one embodiment, HTML 124 includes a code snippet 126, which we will discuss in greater detail below. In summary fashion, snippet 126 provides one illustrative way to download a script or similar that provides other functional aspects of the invention.

At this point, there is the potential for semantics to introduce a degree of confusion that is not intended. We recognize that those of ordinary skill in the art might use different phrases to refer to different items. Thus, while we work under the constraints of a patent application, trying to explain concepts and illustrate items in figures, and even use particular terms in particular situations, we do not necessarily mean to imply that certain differences exist when, skilled artisans would realize that they do not. We are mindful of the axiom that words mean things, and of such presumptions such as when different words are used they mean different things. But that might not always be the case herein.

Just as if the first person referred to a "car" but then later an "automobile," some familiar with both would not think that a different meaning was intended, so it is with various terms that we might use herein. For example, we might refer to "HTML" and then later "source code." In the vernacular art, some people refer to HTML synonymously with a web page, whereas others or even the same people, would make no meaning for distinction between source code and HTML. Depending on the context, one term may flow easier than the other, but we do not necessarily mean to imply a market difference. By way of further illustration, the term "document object model" (DOM) is a term that is often used to describe a representation of a web page. Some artisans equate source codes with a page's DOM, and explain that the DOM is a platform- and language-independent standard object model for representing HTML, XML and related formats. A web browser does not have to use DOM in order to render an HTML document. JavaScript scripts leverage DOM to inspect or modify a web page dynamically, and as will be explained, this is one technology that can be used in one embodiment of the present invention. The Document Object Model is a way that JavaScript sees an HTML page and browser state.

In one embodiment, HTML 124 is received at client device 112, and represented in memory by DOM 128. A web page's document object model can be manipulated using a scripting language. For example, JavaScript can be used to manipulate a document object model dynamically. That is, third parties can manipulate source code in real time by manipulating the appropriate DOM. In one embodiment, DOM 128 indicates a browser's representation in code of web page 114. As we will explain in greater detail below, a web page's initial DOM 128 can be modified by a modification component 130 to produce 132 a modified document object model 134, which is what is ultimately rendered by client device 112 and presented as web page 114. In some embodiments, modification component 130 takes the form of a script that modifies an initial document object model 128 to supplement with additional programmatic code to produce a modified document object model 134.

In one embodiment, modification component 130 takes the form of a downloaded script such as a script 136, which is downloaded from a server 138. Thus, in some embodiments, script 136 and modification component 130 are the same thing. We refer to them by different numerals for the sake of clarity. One role that script 136 provides is that of a client-side script that parses source code of a web page to identify key words, event triggers, and/or actions to be carried out incident to an occurrence of any of the event triggers, and event triggers being some happening that will trigger some action to be carried out, such as an ultimate refreshing of advertising units 118 with fresh advertising content received by way of server 138 or delivery engine 140 (an illustrative ad-delivery component). We reference a trigger by numeral 142 in FIG. 1.

Server 138 can be any computing device, including a computing device such as one schematically represented in FIG. 2. In some embodiments, it takes the form of a key word-extraction server which extracts key words from web page 114. In some embodiments, content 116 is crawled to identify key words that are contextually relevant to the overall content 116 or the portions thereof. So the server 138 can also store triggering events that give rise to certain actions as well as those actions. Triggers include things such as hovering, scrolling, clicking, focusing, blurring, keyboard events, onload events, and timers.

Thus, a nonexhaustive list of illustrative triggers include defined actions such as Onabort (loading of an image is interrupted); Onblur (an element loses focus); Onchange (content of a field changes); Onclick (mouse clicks an object); Ondblclick (mouse double-clicks an object); Onerror (an error occurs when loading a document or an image); Onfocus (an element gets focus); Onkeydown (a keyboard key is pressed); Onkeypress (a keyboard key is pressed or held down); Onkeyup (a keyboard key is released); Onload (a page or an image is finished loading); Onmousedown (a mouse button is pressed); Onmousemove (the mouse is moved); Onmouseout (the mouse is moved off an element); Onmouseover (the mouse is moved over an element); Onmouseup (a mouse button is released); Onreset (the reset button is clicked); Onresize (a window or frame is resized); Onselect (text etc. is selected); Onsubmit (a submit-type button is clicked); Onunload (the user exits the page).

By way of example, if a user hovers over some word or phrase, that might be a trigger. Scrolling web page 114 might be a trigger. Clicking on some control or image or the like might be a trigger. Entering into "focus" a text box might be a trigger. Leaving the text box "blur" might be a trigger. Some sort of key stroke events might be a trigger. As a web page loads, its loading might serve as a trigger. A passing of a certain amount of time might serve as a trigger as well. As briefly mentioned, an action can be any happening that occurs incident to a triggering event. An illustrative action might be to initially gather or determine a set of descriptive terms that are associated with one or more key words. An ultimate action might be refreshing advertising content in ad units 118. We will describe these steps in greater detail below.

As also briefly mentioned, an aspect of the present invention is to be able to present advertising content on a web page based on a user's interaction with that web page. Advertisements can be dynamically triggered based on a user's interaction with the web page. Historically, one of the ways that advertisements are dynamically presented to a user involved a user moving his or her mouse over a highlighted term such as a double underlined term. This would cause a pop-up ad to be presented to a user that would obscure surrounding content. These ads are undesirable for various reasons including the fact that they obstruct a view of a current web page and are generally cumbersome and awkward at best for the user. But an embodiment of our invention enables relevant advertising content to be presented to a user or other by way of web page 114 in a manner that does not obscure any content such as content 116, but still includes ads that are relevant to a user.

At a high level, and in terms of one embodiment, script 136 can be used to parse content of source code that defines a web page looking for information that might already be present in the web page that defines key words, triggers, and/or actions. In other embodiments, a request 144 can be directed to server 138 requesting information that is relevant to the web page. This would be applicable in a scenario in which a web page has either already been precrawled or a user has identified different key words and triggers and the like such that the information relating to key words, triggers, and/or actions is stored in server 138.

As we will explain, there are various ways in which HTML 124 can be modified to indicate key words and the like. Briefly, one way is to utilize a program that automatically crawls the web page's content, determines key words, determines a set of triggers, as well as actions to be carried out incident to those triggers. A second way can involve the first or independently rely on a user indicating in HTML 124 key words, picking custom figures, as well as actions. In an illustrative third way, items such as key words can be dynamically generated or identified in real time based on a user's interaction with the website. For example, a user might type text in some text box, and that text itself serves as a key word.

Thus, in some embodiments, information 146, which might be referred to as supplemental information, is returned to client device 112. The supplemental information 146 might include key words, triggers, and/or actions associated with those triggers.

Of the many uses for different embodiments of our invention, one use includes updating advertising content based on key words of a web page such as web page 114. A key word can be any word or group of words or phrase that might appear in, for example, content 116. An illustrative key word might be "car." In some circumstances, the key word might be ambiguous or be of such a nature that publisher 122 desires certain descriptive terms that describe the key words or that are associated with the key words to be sent to delivery engine 140 by way of a request 148 for new ads.

By way of example, even though a key word might be "car," descriptive terms that are uploaded might be "acme model 4" or "hybrid vehicle." These descriptive terms that are related to key words of web page 114 can be used at least in part to determine what advertising data 150 is to be returned to client device 112 and ultimately used to refresh ad units 118. The determination of these descriptive terms might happen in a variety of ways. In some embodiments, the descriptive terms are present in HTML 124 or modified DOM 134. In other embodiments, the descriptive terms are either created and/or determined in real time even based on a user's interaction.

For example, a user might type "sports" into an "interests" text box. Then, on the occurrence of some trigger, that text box might be referenced such that "sports" becomes a descriptive term (as well as a key word) that is uploaded to either server 138 and/or delivery engine 140. We note that we show the request for ads 148 being directed to delivery engine 140, but in some embodiments server 138 and delivery engine 140 might actually be the same device, which we indicate by broken line 152. In other embodiments, delivery engine 140 is a different device than server 138. In such a case, delivery engine 140 could be any computing device, and may also take the form of that which is schematically represented by FIG. 2.

Previously, we explained that key words, triggering events, and/or actions might be identified within modified DOM 134. One way of accomplishing this is by use of a markup language. A variation of markup language can be used to designate such things as "when user leaves X text box, upload words typed in Y field." Some artisans might refer to this language as an ad-triggering language, which can take the form of a markup language such as a variation of HTML. This language can be used in some embodiments to designate key words, descriptors, triggers, and what to do when a given trigger occurs. "Descriptors" is another term that we use to describe the descriptive terms that are associated with key words and that are uploaded to be used to identify relevant advertising content to be used to refresh ad units 118. We will provide some examples of illustrative syntax for this markup language in FIGS. 5-8.

Having introduced various concepts at a high level, we will now provide some lower level aspects and more illustrations relevant to various embodiments of the present invention. There are many different ways in which different embodiments of the present invention can be carried out. We will describe some illustrative situations and ways in which the invention can be carried out, but the different items that we select and technologies that we describe should not be construed as to limit the invention; but rather to shed light on the various different ways of carrying out the many different embodiments of the present invention.

By way of example, we will first describe an example where there is no ad-triggering language present in HTML 124. In some embodiments, snippet 126 might not be included in HTML 124 at a certain point in time. In such a situation, snippet 126 can be manually added to HTML 124, or it can be manually or pseudo-manually added to HTML 124. One of the roles of snippet 126, which generally takes the form of a small amount of programmatic code, is to initiate or carry on a process of equipping web page 114 or enabling web page 114 with an ability to dynamically trigger a refreshing of advertising content presented in ads 118.

Figure 3:
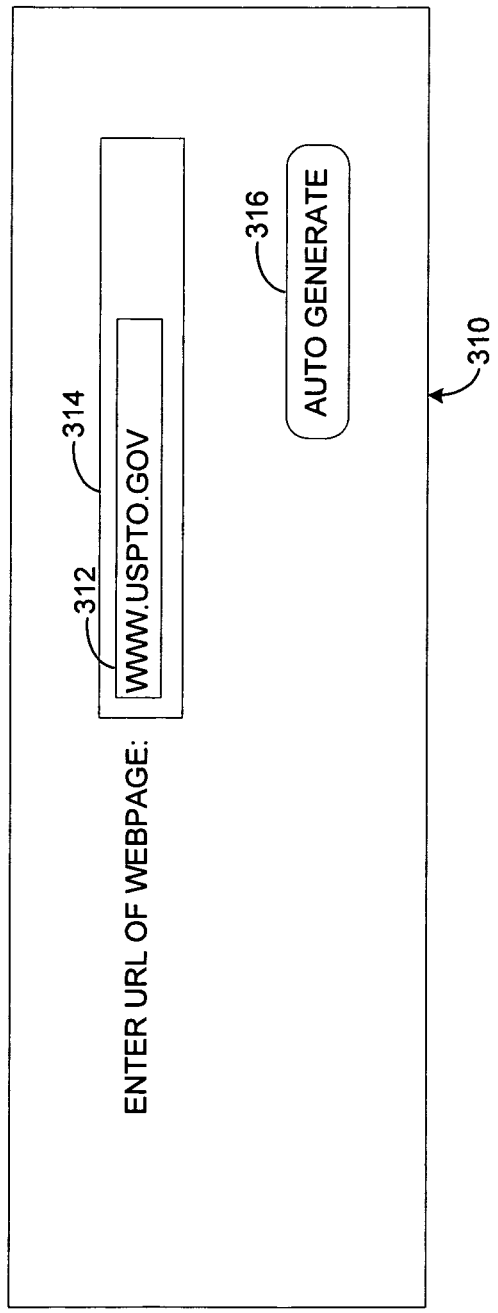
FIG. 3 depicts an illustrative user interface for entering a URL of a web page to be seated or crawled according to an embodiment of the present invention.

In one embodiment, if a user wishes to add snippet 126 to a web page that does not include snippet 126, then the user might be presented with a user interface as is illustratively shown in FIG. 3 and referenced generally by the numeral 310. A user can enter a URL 312 into text box 314. This can also be used to automatically generate key words from the designated web page. To do this, a user would click on button 316 to automatically generate the markup language that will designate automatically determined key words, triggers, and/or actions. In this way, key words can be automatically identified and descriptive terms automatically generated. Default triggers can either be automatically defined or manually defined (which we will discuss later). Default actions such as the ones that we mentioned earlier can also automatically be defined by a crawler that crawls HTML 124. On the occurrence of some trigger, the relevant descriptive terms are sent to either server 138 or delivery engine 140, which uses the key words to send down advertising data that is used to refresh ad units 118.

We previously mentioned that if automatic crawling is not desired (publisher may not desire, access to web page might me limited, etc), then any level of control could be exerted to more particularly define key words, triggers, and/or events. By way of illustration, a user interface such as that of FIG. 4 might be presented to a publisher who wishes to have more control over what words become key words, what the descriptors are that service descriptor terms to modify the key words, what are the different triggers of trigger events, and actions.

Figure 4:
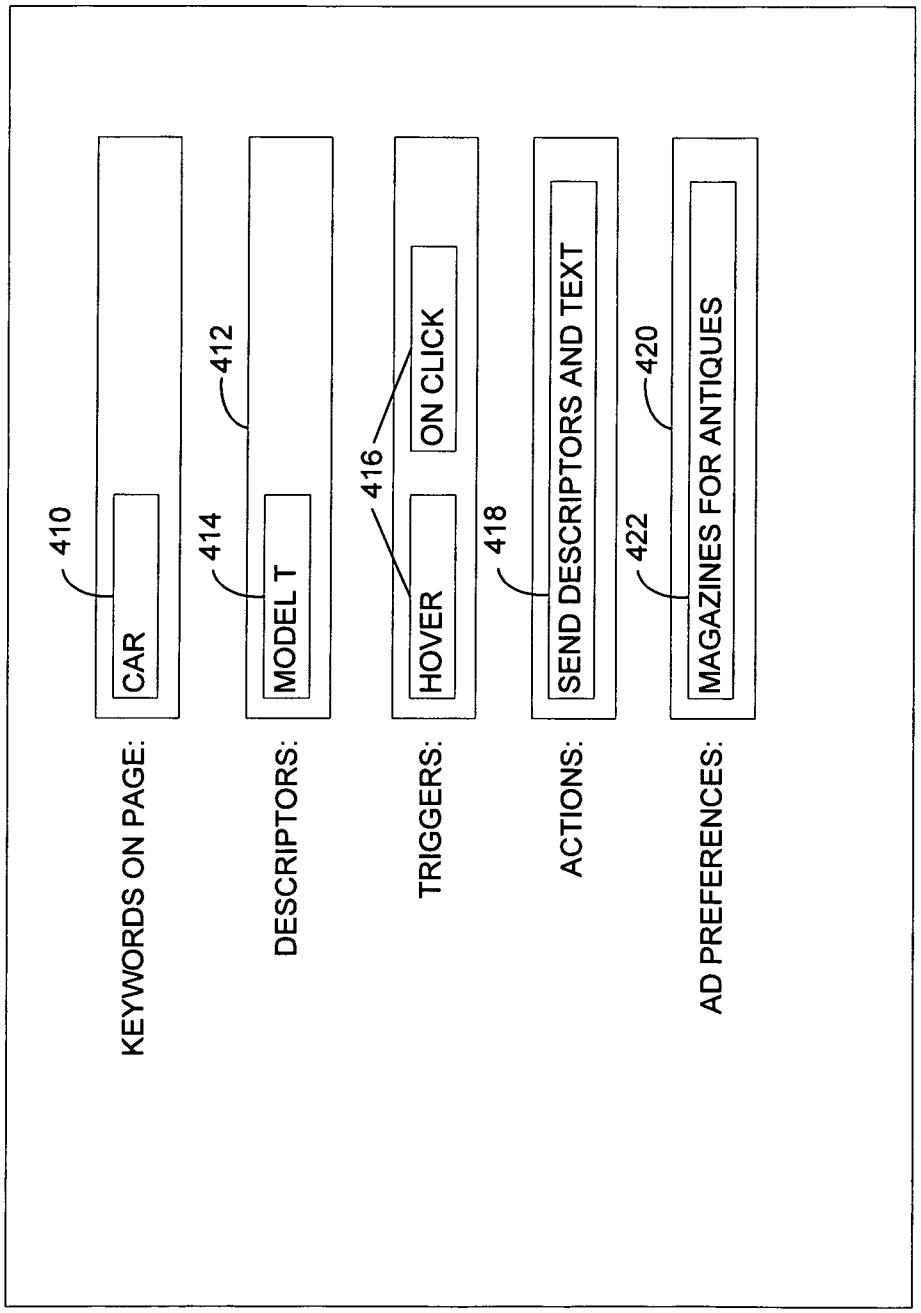
FIG. 4 depicts another illustrative user interface for helping a publisher identify key words and the like according to an embodiment of the present invention.

By way of illustration and with reference to FIG. 4, we simplistically illustrate that "car" 410 is a publisher-defined key word on some web page. Thus, whenever this web page renders, all occurrences of "car" will be tagged as key words. If publisher 122 desires that a specific descriptive term be uploaded in connection with a request for ads incident to a triggering event, then publisher 122 can designate this by using text box 412 by way of example. An illustrative descriptive term might be "model T" as referenced by numeral 414. Two illustrative events are shown as being defined. They include hover and "on click." This designation would mean that whenever any occurrence of "car" is either hovered over or clicked, the term "model T" is to be uploaded to delivery engine 140. This action is designated by numeral 418, which says "send descriptors and text." The "and text" designation illustrates one embodiment in which "car" is also uploaded in addition to the descriptor "model T" 414.

In some embodiments, additional information could be provided to delivery engine 140 as well. We show in box 420 "magazines for antiques" 422, which provides further instruction to delivery engine 140 to send down advertisements for magazines for antiques. Again, clearly this is just one example of information that might be sent, when this illustrative example includes an advertisement preference. FIG. 4 helps illustrate at least one aspect of what we previously referred to as a pseudo-manual way in which a publisher can designate things such as key words and descriptive terms. The illustrative in FIG. 4 provides a user interface that will receive the content entered and use that data to tag different portions of source code by way of the markup language that we previously referred to.

Continuing with a first illustration, a web page is requested at client device 112. As the web page is being processed, snippet 126 is processed, which, in one embodiment, initiates a downloading of script 136 to client device 112 if script 136 is not present. In other embodiments, it triggers a launching of script 136 which operates on an initial document object model 128 of received HTML 124 to effect a modified document object model 134. That is, the web page's document object model 128 is modified consistent with the advertising information either within HTML 124 and/or with the information 146 stored in server 138. Again, as we previously mentioned, it might be the case that supplemental information associated with the web page is stored in server 138. This information 146 can be received and used to create the modified DOM 134. In one embodiment, this modification 132 is accomplished by way of a scripting language working in concert with a dynamic markup language. For example, in one embodiment, dynamic HTML (DHTML) and JavaScript are leveraged to modify the initial DOM 128 to create the modified DOM 134, which now includes markup language that identifies key words, triggers, and/or actions to be carried out in connection with an occurrence of the triggers.

Still continuing with this example, web page 114 has been rendered and presented on a display device of client device 112. Client device 112 now waits for an occurrence of some triggering event 142. In one embodiment, script 136 monitors for an occurrence of triggering event 142, which can be any number of triggering events. At an occurrence of a triggering event, descriptive terms associated with the relevant key words are identified and a request 148 for advertisements is sent to delivery engine 140, which returns advertisement data 150 to be used to refresh the information presented in ad units 118. For example, an ad unit might have had an initial advertisement before triggering event 142 occurred, but incident to an occurrence of triggering event 142, the information presented in advertising unit 120 would be updated to reflect advertisement data 150.

We will now provide a second description of an illustrative embodiment of the present invention, one in which snippet 126 is present in HTML 124, and in which ad-triggering language (or similar markup language) is present and ascertainable. In such a scenario, script 136 (which can be modification component 130) parses the specific markup language in a source code that makes up the web page, and provides DOM events, other events, tag events, and all other events, and inserts handles to these events that would call up to server 138 at the occurrence of a triggering event 142. One way of this occurring would be that as a browser begins to render HTML 124, it encounters snippet 126, which initiates either a downloading and/or an execution of script 136 on client machine 112.

The script is executed to parse the HTML in search of predefined tags that define key words, event triggers, actions, or any other items that are desired to be denoted in connection with facilitating a refreshing of content in advertising units 118. In some embodiments, a flag is set that can be leveraged by publisher 122 such that if the flag is set then this would indicate to script 136 to use the ad-triggering language that is current in HTML 124. If the flag is set to a different state, then any ad-triggering language present in HTML 124 should be supplemented with the information 146 that is stored in server 138.

Thus, in some embodiments, there is no ad-triggering language present in HTML 124, in other embodiments, there is ad-triggering language present in HTML 124 that is used exclusively, and for other embodiments, a combination exists wherein ad-triggering language in HTML 124 is used to identify key words, triggers, etc. in HTML 124 and those triggers and key words are supplemented with the key words and triggers stored in server 138. We note that although we do not always list each of key words, triggers, actions, advertising preferences, etc., we do so to help reduce wordiness not to indicate a conscious attempt to exclude portions of supplemental information that are not listed.

Having identified the relevant key words, event triggers, and actions, modification component 130 modifies initial DOM 128 to produce the modified DOM 134, which is rendered by a browser running on computing device 112 in one embodiment. This results in web page 114 being presented on presentation component 216. The various triggers are associated with the corresponding various key words or other objects (e.g., text boxes, radio buttons, drop-down lists, items such as images and the like, links, etc., all of which are can be trigger objects). Event handlers are associated with the various triggers in some embodiments. In one embodiment, script 136 listens for a triggering event. When it receives an indication of a triggering event such as trigger 142, this gives rise to an execution of the same or a different script. The parsed data is inspected to identify the appropriate descriptive terms associated with the like key words to be uploaded to server 138. Generally, descriptive terms are uploaded to server 138, or delivery engine 140. Thus, request 148 for new advertising content is sent to delivery engine 140 for example. This request 148 would include the descriptive terms associated with the key words. Relevant advertising data 150 is sent to client device 112 which uses the data to refresh ad units 118.

As previously mentioned, markup language can be utilized to designate key words and the like in source code of a web page. We will now provide additional details regarding a variation of markup language in accordance with an embodiment of the present invention. Turning initially to FIG. 5, an excerpt of web-page source code is provided and referenced generally by the numeral 500. Preliminarily, we note that skilled artisans might refer to different portions of code 500 in different ways.

Again, although we might use some names to refer to certain aspects of portions of the code, we do so for the sake of mapping words to a drawing rather than dogmatically defining terms. For example, some artisans might refer to the entire portion 510 as a tag. Other artisans might refer to what is designated by numeral 512 as the tag, with portion 514 being the name space and 516 being the element. In the illustrative example shown, portion 518 "mesothelioma" is the key word. If a web page did not interpret or was not able to interpret tags 512, it would simply render "mesothelioma" as a word. As shown, code 500 includes a name space 514 "ATRL." This is an illustrative abbreviation of what we are referring to as "ad-triggering language," a use of markup language to identify various ad-related items such as keywords, trigger events, and actions. The specific tag "ATRL" certainly does not need to be used, but any tag that is identifiable as being a tag that has the purpose of designating a key word as we have used the term can be used instead.

Portion 514 indicates that this variation of markup language or equivalent is present. Element 516 is "key word." Thus, "key word" 516 is an element that indicates that "mesothelioma" is to be a key word. Code portion 510 does not specifically identify any triggering events. In such a case, there might be default triggering events that are associated with the programmatic code such that when an occurrence of one of these default triggering events on a key word gives rise to some action to be carried out. A purpose of FIG. 5 is to provide one illustrative example of an exemplary syntax of a way to designate key words for example within a body of source code that defines a web page.

Turning now to FIG. 6, another segment of code 600 provides another variation of identifying key words, and in this case actions that are to occur incident to one or more triggering events. Again, an illustrative opening tag 610 defines a code portion 612 that is bound by a closing tag 614. Code portion 612 includes an element identifier 616 "text" as well as a triggering event 618, which in this case is "onblur." What this example provides is an illustration of how some element identified by the term "text" is associated with some action, which in this case is an on-blur event; namely, an event associated with tabbing out of a text box for example. Two actions are shown as being associated with a triggering event 618. A refresh action indicates an ad-group identifier 620 as well as a set of key words 622.

A way of reading this would be when the "text" element is tabbed out of, refresh the ad unit identified as "topad" using the key words "car" and "BMW." Another action is included as well. This second action includes a show action 624 that is also associated with "topad" 626. This second action might cause the ad unit "topad" to be made visible incident to the blur event associated with the "text" element. Accordingly, in this example, a content owner uses markup language to specify an ad-refresh action with the key words "car" and "BMW." This will occur when the user types any text into a certain text box on the page. Moreover, in this example, the content owner is hard coding key words being passed to delivery engine 140. To help make ads more relevant to a user's actions, a script call can be embedded as an alternative to this example shown in FIG. 6. We show an example of this in FIG. 7.

As briefly mentioned, FIG. 7 depicts a code portion 710 that takes the form of a script to determine key words in real time. Thus, the content owner uses markup language to specify an ad-refresh action 712 with dynamic key words based on the text entered by the user in the text box identified by the "text" identifier 714.

Still another way of generating key words is to leverage server side code. FIG. 8 depicts the concept of embedding an XML island or equivalent into an HTML page to facilitate a server-side right or external file reference. This code 800 can be utilized to facilitate building relevant ad-triggering language server side.

Turning now to FIG. 9, we represent a first illustrative method for practicing an embodiment of the present invention. To help explain this first illustrative method more clearly, we will reference various figures, which should be easily found because generally the first number in each reference numeral identifies the figure on which the referenced numeral can be found. As mentioned, it might be the case that a web page is precrawled and/or a user adds supplemental information by way of markup language to designate key words, assign triggers, indicate actions, and the like. At a step 912, client device 112 requests a web page of publisher 122. If necessary, client-side script 136 is downloaded at a step 914.

As mentioned, script 136 can provide various functions according to different embodiments of the present invention. Some illustrative functions that it might carry out include parsing ad-triggering language presently in HTML 124. Other functions that it might perform include fetching predetermined key words, triggers, and actions that are associated with web page 114 and stored in server 138. This is represented by numeral 916, which includes reference and supplemental information, such as key words, triggers, and actions. We have previously explained that this supplemental information might be provided in various ways. The illustrative ways include dynamically parsing a web page's source code if supplemental information is not present, retrieving supplemental information that is previously stored in server 138, and/or updating a web page's current source code that might even include ad-triggering language with supplemental information 146 received from server 138, and then even possibly parsing the supplemented page.

At a step 918, if the web page's DOM has not already been modified, then it is modified consistent with the supplemental information. Thus, for example, if a web page initially had no ad-triggering language in it, but then received supplemental information 146, then its original source code would be modified so that the appropriate tags of the appropriate content of the web page could be added.

At a step 920, preparation is made to respond to triggers with desired actions. In one embodiment, this includes associating event handlers to triggering events. We have previously mentioned several illustrative triggering events such as a mouse click, hovering, keyboard clicks, timers expiring, scrolling actions, keystrokes, and the like. The event handlers can be configured such that when one of those events happens the event handler carries out the desired action.

If a triggering event occurs, then an indication of that triggering event occurring is designated by numeral 922. At a step 924, the designated action associated with the trigger occurs. In this illustrative example, the action includes submitting a request to server 138 (or delivery engine 140) to refresh designated ads based on appropriate descriptors (descriptive terms). In one embodiment, parsed data is inspected or in-line scripts are processed in connection with this step.

New advertisement data 150 is received at a step 926, and at a step 928, designated actions are carried out. Illustrative actions include things like refresh, show, and the like. So it might be the case that an advertising unit 118 was to have its content refreshed. It might be the case that one of the ad units 118 was to be made visible, or even invisible.

Figure 10:
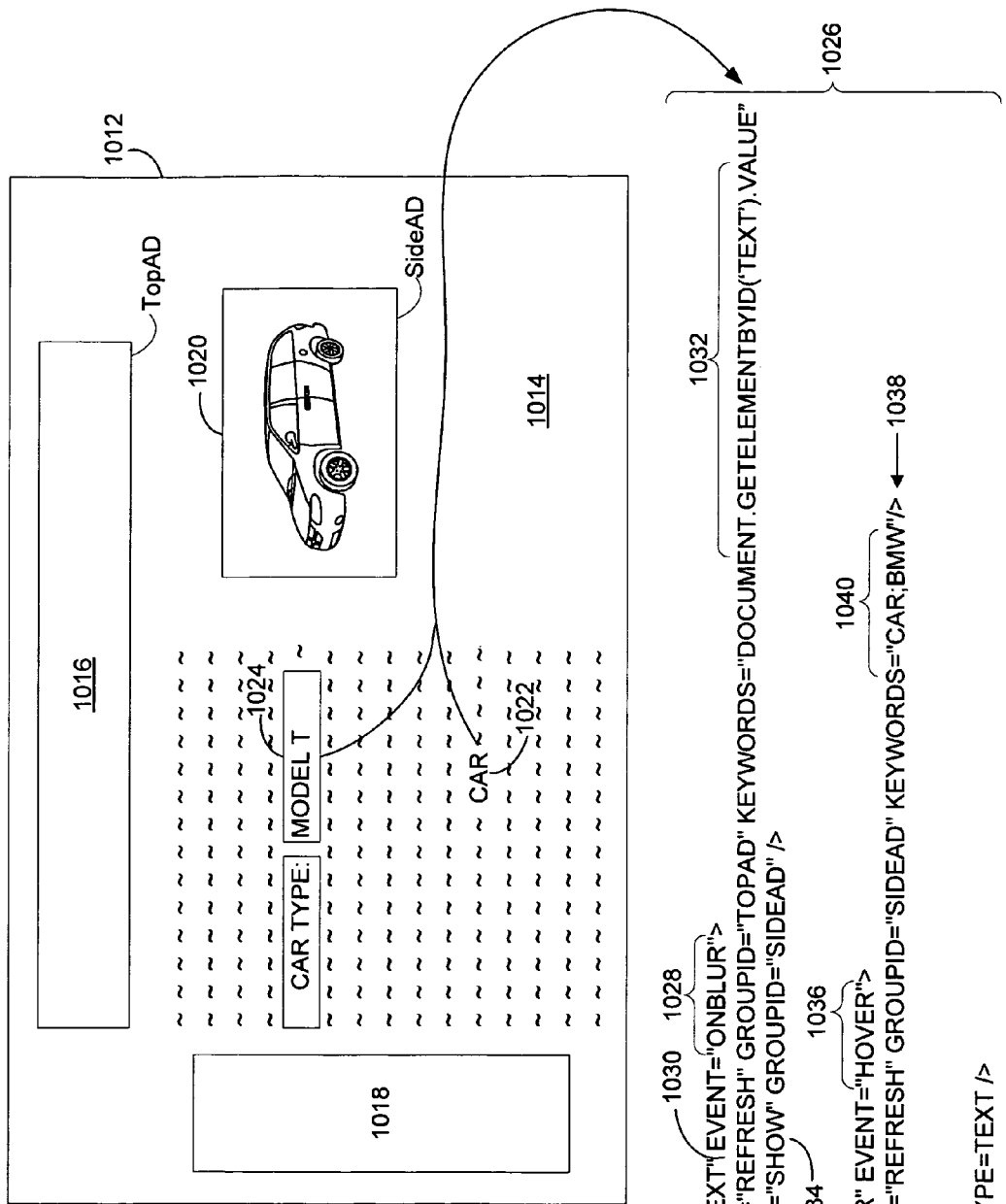
FIG. 10 depicts an illustrative web page associated with illustrative ad-triggering language according to an embodiment of the present invention.
Figure 11:
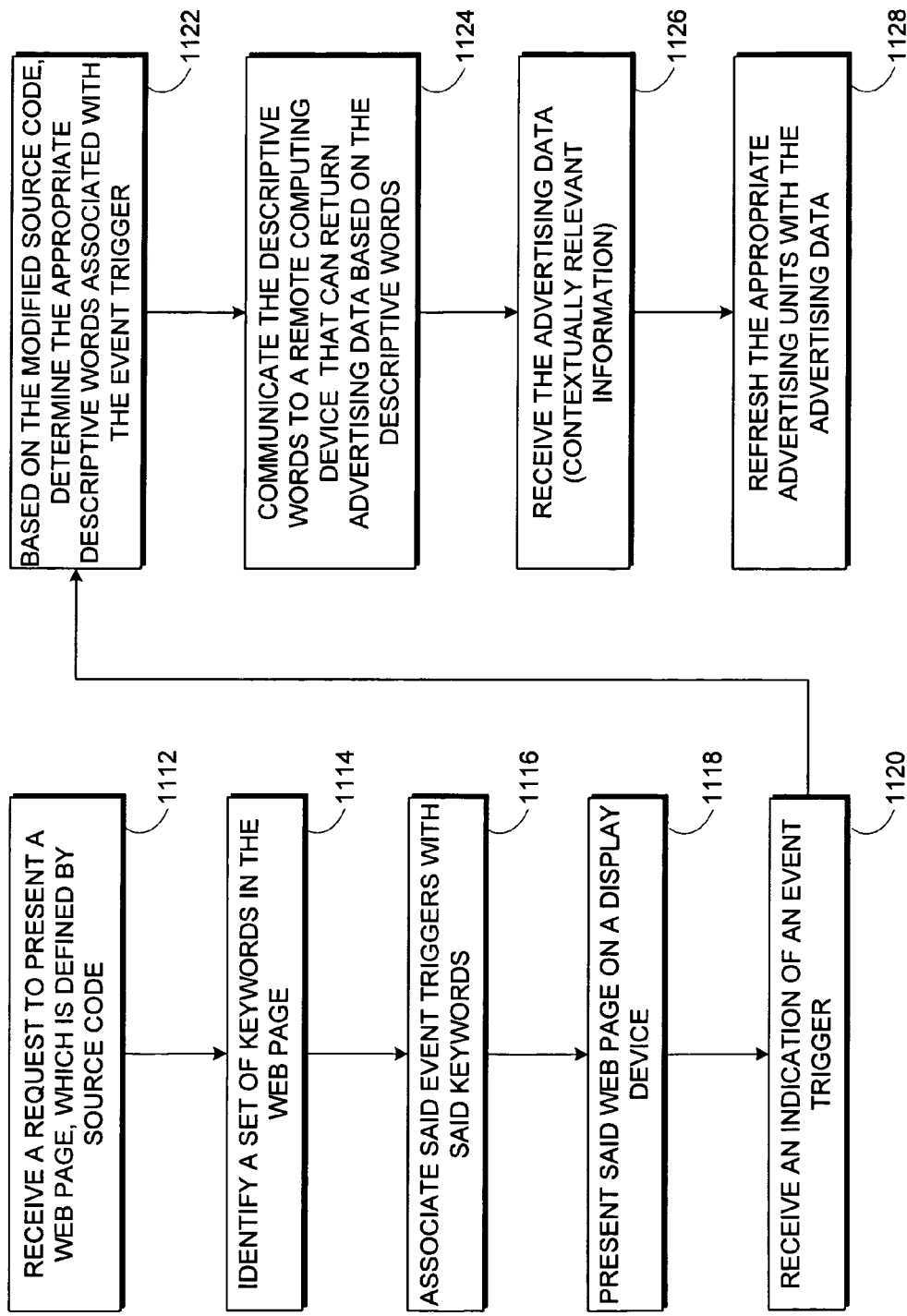
FIGS. 11-12 depict two additional methods for carrying out embodiments of the present invention.
Figure 12:
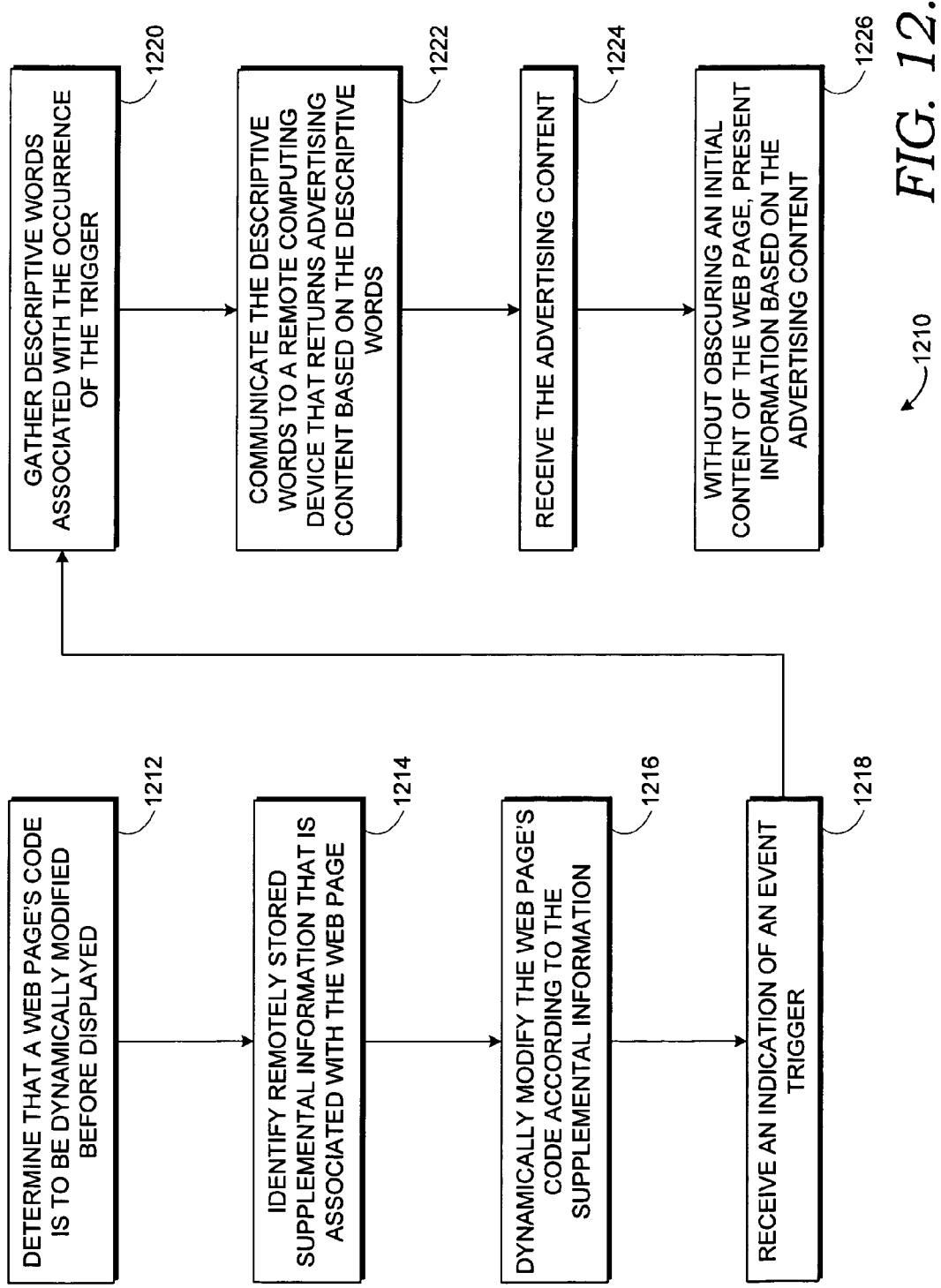

We will describe two more illustrative methods for practicing an embodiment of the present invention, a first with reference to FIG. 11, and a second with reference to FIG. 12. Each will include references to FIG. 10, which depicts an illustrative screenshot 1012 of a web page 1014 that includes a first ad unit 1016 as well as a second ad unit 1018. First ad unit 1016 is referred to as "topad." Still a third ad unit 1020 is identified by the identifier "sidead." An illustrative key word "car" is indicated by reference numeral 1022. A text box 1024 is associated with an identifier "text." Key word 1022 and text box 1024 are associated with an illustrative segment of programmatic code 1026, which includes, among other things, instructions associated with an "onblur" event 1028. This might mean that when a user tabs out of text box 1024, topad 1016 is to be refreshed 1030 according to the key words in text box 1024, which in this case would be "model T." The key word determination flows from code portion 1032. Another action indicates to show 1034 ad unit 1020, which is associated with the identifier "sidead" (side ad). Another illustrative triggering event depicted in code 1026 includes a hover action 1036. Thus, when a user hovers a mouse over key word 1022, sidead 1020 is to be refreshed according to the key words "car" and "BMW" according to line 1038.

Turning to FIG. 11, a request is received at a step 1112 to present a web page, which is defined by source code. At a step 1114, a set of key words in a web page are identified. The key words will be associated with triggers such that if a user interacts with an identified key word by way of the trigger, then some action is to occur. The key word can be described by one or more descriptive words. By way of example, an illustrative key word in FIG. 10 includes "car" 1022. Key words associated with car might be "model T" 1024 as well as "car" and "BMW" 1040.

At a step 1116 event triggers are associated with the key words. As should be clear, this may not be a separate step. One way of associating event triggers with key words is by utilizing the markup language, such as that illustratively shown in code portion 1026. Code portion 1026 illustrates how event triggers are associated with key words according to an embodiment of the present invention. In this example, triggers such as onblur 1028 and hover 1036 are associated with "car" 1022. Although step 1116 refers to associating event triggers with key words, the triggering events of course can be associated with other controls on the web page besides just key words. For example, code portion 1042 illustrates that an onblur event 1028 is associated with a text box 1024 instead of a key word. Text box 1024 includes a key word, but it does not have to. A control could be take on many forms. A control might by any web element. Illustrative web elements include anchors, applets, tables, form controls, text areas, text boxes, windows, and more.

At a step 1118, the web page is presented on a display device. At a step 1120, an indication that an event trigger has occurred is received. The event trigger is associated with gathering certain descriptive terms in one embodiment. With reference to FIG. 10, illustrative descriptive terms include "model T" as well as "car" and "BMW." Based on the modified source code, at a step 1122, the appropriate descriptive words that are associated with the event trigger are determined. We already briefly mentioned different ways in which they can be determined. Code portion 1026 illustrates two ways, one in which the code words are statically defined 1040 as well as another way 1032 in which they are dynamically determined.

At a step 1124, the descriptive words are communicated to a remote computing device (e.g., server 138 or delivery engine 140) that can return advertising data based on the descriptive words. At a step 1126, advertising data 150 is received. As previously mentioned, advertising data can be any text of relevant information. At a step 1128, the appropriate advertising units are refreshed with the advertising data. So by way of example with reference to FIG. 10, topad 1016 would be refreshed with advertising content related to the key word "model T." Sidead 1020 would be updated with advertising content based on key words 1040. Refreshing content in the advertising units can be done without obscuring any content of the web page. Moreover, refreshing the ad units can be done without disturbing even a layout of the web page, except in situations when ad units are made visible or invisible for example. But even in those situations, textual content can be preserved.

Turning now to FIG. 12, another illustrative method for practicing an embodiment of the present invention is provided and referenced generally by the numeral 1210. At a step 1212, a web page's code is determined to be dynamically modified before displayed. One way that this might occur is observing the presence of a small snippet 126 of code that is present in HTML 124. This small code snippet's presence indicates that the HTML 124 of the web page is to be dynamically modified before it is ultimately displayed on a presentation component.

At a step 1214, remotely stored content is identified as being supplemental information that is associated with the web page. As previously eluded to, illustrative supplemental information includes things such as a listing of words on the web page that are to be key words, which are to be associated with descriptive terms that relate to the key words (which descriptive terms might be generated after a rendering of the web page); a listing of triggering events associated with objects of the web page such that if an object is interacted with in a predetermined way, then an action is to follow; and a listing of actions that are to occur incident to the various triggering events. Illustrative objects include text of the web page, placeholders, pictures, multimedia controls, text boxes, etc. The list is legion.

At a step 1216, the web page's code is dynamically modified according to the supplemental information. Thus, an initial document object model 128 that describes the web page is converted to a modified document object model 134 based on the supplemental information that, in one embodiment, is stored in server 138.

At a step 1218, an indication of an event trigger is received. In some embodiments, this indication can be received by script 136, which leverages event handlers to begin a process that flows from an occurrence of the event trigger. At a step 1220, descriptive words are gathered that are associated with the occurrence of the trigger. We explained with reference to FIG. 10 and throughout this disclosure how key words might be gathered. As mentioned, they might be statically defined in the ad-triggering code. They might also be determined in real time possibly even determined based on user input in real time. In still other ways, they might be generated based on server-side script.

At a step 1222, the descriptive words are communicated to a remote computing device such as server 138 or delivery engine 140. The remote computing device can be any device that is adapted to return advertising content 150 based on the descriptive words provided. The advertising content is received at a step 1224, enabling information based on the advertising content to be presented on the web page without obscuring a content of the web page. Thus, by way of example, web page 114 could have its advertising content updated by way of advertising units 118 without obscuring any of content 116. We previously mentioned that one way of modifying the document object model 128 into modified document object model 134 is to leverage DHTML.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention.

It will be understood that certain features and subcombinations are of utility and may be employed without reference to other features and subcombinations and are contemplated within the scope of the claims. Not all steps listed in the various figures need be carried out in the certain order described.

The invention claimed is:

1. A method comprising:
   receiving a request to present a web page, wherein the web page is defined by source code, and wherein the web page includes one or more areas to present advertisements, the one or more areas corresponding to one or more advertising units;
   identifying a set of keywords in the web page, wherein the keywords are to be associated with event triggers such that if a user interacts with an identified keyword by way of the event triggers, then some action is to occur, and wherein the keyword is described by one or more descriptive words;
   dynamically modifying the source code of the web page by associating the event triggers with the keywords in the web page to create modified source code that associates the event triggers with the keywords included in the web page;
   receiving an indication of an occurrence of a certain event trigger of the associated event triggers, wherein the certain event trigger is associated with gathering certain descriptive words of the web page;
   based on the modified source code, determining the certain descriptive words in response to the occurrence of the certain event trigger on the web page rendered from the modified source code;
   communicating the certain descriptive words to a remote computing device;
   receiving advertising data from the remote computing device; and
   refreshing the one or more advertising units with the advertising data in response to user interaction with the keywords of the webpage, wherein the keywords are associated with the certain event trigger.

2. The method of claim 1, wherein the identifying the set of keywords includes doing so by one or more of the following:
   referencing supplemental information stored on a remote computing device, the supplemental information including one or more of:
      the set of keywords,
      the event triggers, and
      actions to be carried out incident to the event triggers; or
   parsing the source code to identify any keywords, event triggers or
   actions currently within the source code.

3. The method of claim 2, wherein the supplemental information is created by one or more of the following:
   receiving an address of the web page, and automatically identifying the set of keywords without user intervention by precrawling the web page; or
   receiving indications from a user of one or more of:
      words that make up the set of keywords,
      indications of the event triggers, and
      indications of the actions to be carried out incident to the event triggers.

4. The method of claim 3, wherein dynamically modifying the source code includes one or more of the following:
   tagging the set of keywords using a markup language to designate the keywords;
   using the markup language to designate the event triggers; or
   using the markup language to designate the actions.

5. The method of claim 4, wherein each of the set of keywords can be any word of the web page.

6. The method of claim 5, wherein the event triggers include a defined action.

7. The method of claim 4, wherein determining the certain descriptive words is accomplished by one or more of the following ways including:
   identifying the descriptive keywords based on them being denoted by the markup language;
   referencing an identified control on the web page to identify the descriptive keywords; and
   receiving the results of an execution of programmatic code on the remote computing device.

8. The method of claim 7, wherein the control on the web page includes any HTML element.

9. The method of claim 1, wherein the advertising data includes information that is contextually relevant to the certain keywords.

10. The method of claim 1, wherein the advertising data includes one or more of:
    presenting in the one or more advertising units information that is contextually relevant to the certain key words;
    showing a previously hidden advertising unit; or
    hiding a previously visible advertising unit.

11. The method of claim 1, wherein the refreshing includes refreshing the one or more advertising units without obscuring any current content of the web page.

12. The method of claim 11, wherein the refreshing includes refreshing the one or more advertising units without disturbing a layout of the web page.

13. A method for presenting advertisements based on user interaction with a web page, the method comprising:
    determining that programmatic code that describes the web page is to be dynamically modified before being presented on a display device;
    identifying remotely stored supplemental information that is associated with the web page, the supplemental information including:
       a listing of words on the web page that are to be keywords, said keywords are to be associated with one or more descriptive terms that relate to the keywords, said descriptive terms might be generated after a rendering of the web page,
       a listing of triggering events associated with objects and the keywords of the web page such that if an object of the objects or a keyword of the keywords is interacted with in a predetermined way on the webpage, then an action is to follow, and
       a listing of actions that are to occur incident to one or more of the triggering events;
    dynamically modifying the programmatic code of the web page to include the supplemental information;
    receiving an indication of an occurrence of a certain event trigger in response to user interaction with the modified web page;
    gathering descriptive words associated with the occurrence of the event trigger;

communicating the descriptive words to a remote computing device that returns advertising content based on the descriptive words;

receiving the advertising content; and without obscuring an initial content of the web page, presenting information based on the advertising content.

14. The method of claim 13, wherein dynamically modifying the programmatic code of the web page includes dynamically modifying an initial document object model (DOM) of the web page, which produces a modified DOM that describes a modified version of the web page, thereby resulting in a modified web page.

15. The method of claim 14, wherein the modified DOM is produced by a script that leverages a dynamic hypertext markup language (DHTML).

16. The method of claim 13, wherein receiving the indication of an occurrence of a certain trigger event includes invoking a scripting event handler that is associated with the triggering event.

17. The method of claim 16, wherein the scripting event handler is a JavaScript event handler.

18. The method of claim 13, wherein gathering the descriptive words includes gathering the descriptive words that are generated from one or more of:
   a client-side script that references one or more of the objects to receive static or dynamically generated descriptive words, including user-provided descriptive words; or
   a server-side script that generates the descriptive terms.

19. A system, the system comprising:
   a server that receives a request to present a web page, wherein the web page is defined by source code, and wherein the web page includes one or more areas to present advertisements, the one or more areas corresponding to one or more advertising units;
   a modification component that:
      identifies a set of keywords in the web page, wherein the keywords are to be associated with event triggers such that if a user interacts with an identified keyword by way of the event triggers, then some action is to occur, and wherein the keyword is described by one or more descriptive words;
      dynamically modifies the source code of the web page by associating the event triggers with the keywords in the web page to create modified source code that associates the event triggers with the keywords included in the web page;
      identifies an occurrence of a certain event trigger of the associated event triggers, wherein the certain event trigger is associated with gathering certain descriptive words of the web page; and
      determines the certain descriptive words in response to the occurrence of the certain event trigger on the web page rendered from the modified source code; and
   a delivery engine, as a subcomponent of the server or as a standalone component, that receives the certain descriptive words from a remote computing device and sends advertising data to the remote computing device,
   wherein the modification component further refreshes the one or more advertising units with the advertising data in response to user interaction with the keywords of the web page, and wherein the keywords are associated with the certain event trigger.

20. The system of claim 19, wherein the modification component identifies the set of keywords at least in part by referencing supplemental information stored on a remote computing device, the supplemental information including one or more of:
   the set of keywords,
   the event triggers, and
   actions to be carried out incident to the event triggers; or
   source code parsed to identify any keywords, event triggers or actions currently within the source code.

21. The system of claim 20, wherein the server further stores supplemental information, the supplemental information having been created by one or more of the following:
   receiving an address of the web page, and automatically identifying the set of keywords without user intervention by precrawling the web page; or
   receiving indications from a user of one or more of:
      words that make up the set of keywords,
      indications of the event triggers, and
      indications of the actions to be carried out incident to the event triggers.

22. The system of claim 21, wherein the modification component dynamically modifies the source code at least in part by one or more of the following:
   tagging the set of keywords using a markup language to designate the keywords;
   using the markup language to designate the event triggers; or
   using the markup language to designate the actions.

23. The system of claim 22, wherein each of the set of keywords can be any word of the web page.

24. The system of claim 23, wherein the event triggers include a defined action.

25. The system of claim 22, wherein determining the certain descriptive words is accomplished by one or more of:
   identifying the descriptive keywords based on them being denoted by the markup language;
   referencing an identified control on the web page to identify the descriptive keywords; and
   receiving the results of an execution of programmatic code on the remote computing device.

26. The system of claim 25, wherein the control on the web page includes any HTML element.

27. The system of claim 19, wherein the advertising data includes information that is contextually relevant to the certain keywords.

28. The system of claim 19, wherein the advertising data includes one or more of:
   presenting in the one or more advertising units information that is contextually relevant to the certain key words;
   showing a previously hidden advertising unit; or
   hiding a previously visible advertising unit.

29. The system of claim 19, wherein the refreshing includes refreshing the one or more advertising units without obscuring any current content of the web page.

30. The system of claim 19, wherein the refreshing includes refreshing the one or more advertising units without disturbing a layout of the web page.

* * * * *